(12) United States Patent
Rhyne et al.

(10) Patent No.: US 11,203,233 B2
(45) Date of Patent: Dec. 21, 2021

(54) TIRE SPOKE WITH CRACK SUPPRESSION FEATURE

(71) Applicant: Compagnie Generale des Etablissements Michelin, Clermont-Ferrand (FR)

(72) Inventors: Timothy Brett Rhyne, Greenville, SC (US); Steven M Cron, Simpsonville, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 759 days.

(21) Appl. No.: 15/756,460

(22) PCT Filed: Aug. 29, 2016

(86) PCT No.: PCT/US2016/049232
§ 371 (c)(1),
(2) Date: Feb. 28, 2018

(87) PCT Pub. No.: WO2017/040390
PCT Pub. Date: Mar. 9, 2017

(65) Prior Publication Data
US 2018/0250986 A1 Sep. 6, 2018

Related U.S. Application Data

(63) Continuation of application No. PCT/US2015/047703, filed on Aug. 31, 2015.

(51) Int. Cl.
*B60C 7/18* (2006.01)
*B60B 9/26* (2006.01)
*B60C 7/14* (2006.01)

(52) U.S. Cl.
CPC .............. *B60C 7/18* (2013.01); *B60B 9/26* (2013.01); *B60B 2900/212* (2013.01); *B60C 7/146* (2021.08)

(58) Field of Classification Search
CPC ........ B60C 2007/146; B60C 2900/212; B60C 7/18; B60B 1/0261; B60B 1/0264; B60B 9/26; B60B 2900/212
See application file for complete search history.

(56) References Cited

U.S. PATENT DOCUMENTS 2,235,378 A * 3/1941 Martin ................... B60B 9/26
152/7
9,962,994 B2 * 5/2018 Iwamura ................. B60C 7/14
(Continued)

FOREIGN PATENT DOCUMENTS

CN       204586330 U      4/2016
DE       10146972 A1 *    4/2003    ............... B60B 1/08
WO    WO-2014199652 A1 * 12/2014    ............... B60C 7/18

OTHER PUBLICATIONS

International Search Report and Written Opinion, dated Nov. 15, 2016.

*Primary Examiner* — Scott A Browne
(74) *Attorney, Agent, or Firm* — John Steckler Schwab

(57) ABSTRACT

A tire that has a hub and a spoke is provided. The spoke extends from the hub in a radial direction of the tire. The spoke has a first face and a second face that are spaced from one another in a longitudinal direction of the tire. The spoke has a crack suppression feature that has a groove that extends into the first face. The groove extends in the radial direction.

3 Claims, 8 Drawing Sheets

(56) References Cited

U.S. PATENT DOCUMENTS

| | | |
|---|---|---|
| 2010/0200131 A1 | 8/2010 | Iwase et al. |
| 2012/0067481 A1 | 3/2012 | Cron |
| 2013/0200685 A1* | 8/2013 | Morris .................... B60B 27/02 301/111.03 |
| 2013/0263992 A1* | 10/2013 | Matsumoto ........... B60C 13/001 152/523 |
| 2015/0174953 A1 | 6/2015 | Cron et al. |
| 2016/0089935 A1* | 3/2016 | Iwamura ................ B29D 30/02 152/69 |
| 2016/0121656 A1* | 5/2016 | Sugiya ..................... B60C 7/00 152/69 |

* cited by examiner

TIRE SPOKE WITH CRACK SUPPRESSION FEATURE

FIELD OF THE INVENTION

The present invention relates generally to non-pneumatic tires that have spokes with a crack suppression feature that minimizes cracking in the spoke and extends the life of the tire. More particularly, the present application involves a crack suppression feature that is a three dimensional feature located on the spoke that causes the strain energy release rate to be low enough to stop crack propagation.

BACKGROUND

Tires for vehicles and other applications may include an inner hub or wheel surrounded circumferentially by an outward radially disposed tread that includes an annular shear band. A series of spokes can be disposed radially between the hub and tread and can function to connect these two components. As the tire rotates under load, the spokes experience bending, extension and compression deformation when they are located downward near the contact patch of the tire. The spokes straighten outside the contact patch relieving the bending and compression deformation. The spokes thus experience cyclic deformation as the tire rotates. These repeated deformation cycles cause fatigue in the spokes and limits the life of the spoke and tire.

Process flaws and bubbles developed during manufacturing of the spokes in the tire may tend to greatly increase the local energy density at particular locations of the spokes. These flaws may cause cracks to form, and without a mechanism in place to prevent crack propagation the crack may extend to such a degree that the spoke fails. Cracks in the spokes may also occur through damage caused during usage of the tire. Current methods of preventing cracks in spokes involve the minimization of the strain energy density in the spokes during deflection. One such design to improve durability of spokes may be found in published application number WO 2013/152067 A1 entitled, "spoke for a tire with optimized thickness for improved durability", the contents of which are incorporated by reference herein in their entirety for all purposes. This design seeks to modify the edges of the spoke to de-sensitize them to crack initiation.

Although previous designs are known that seek to prevent the start of a crack, it may be the case that a design that stops a crack that has already formed may likewise function to prevent cracking and extend the life of the spoke and tire. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
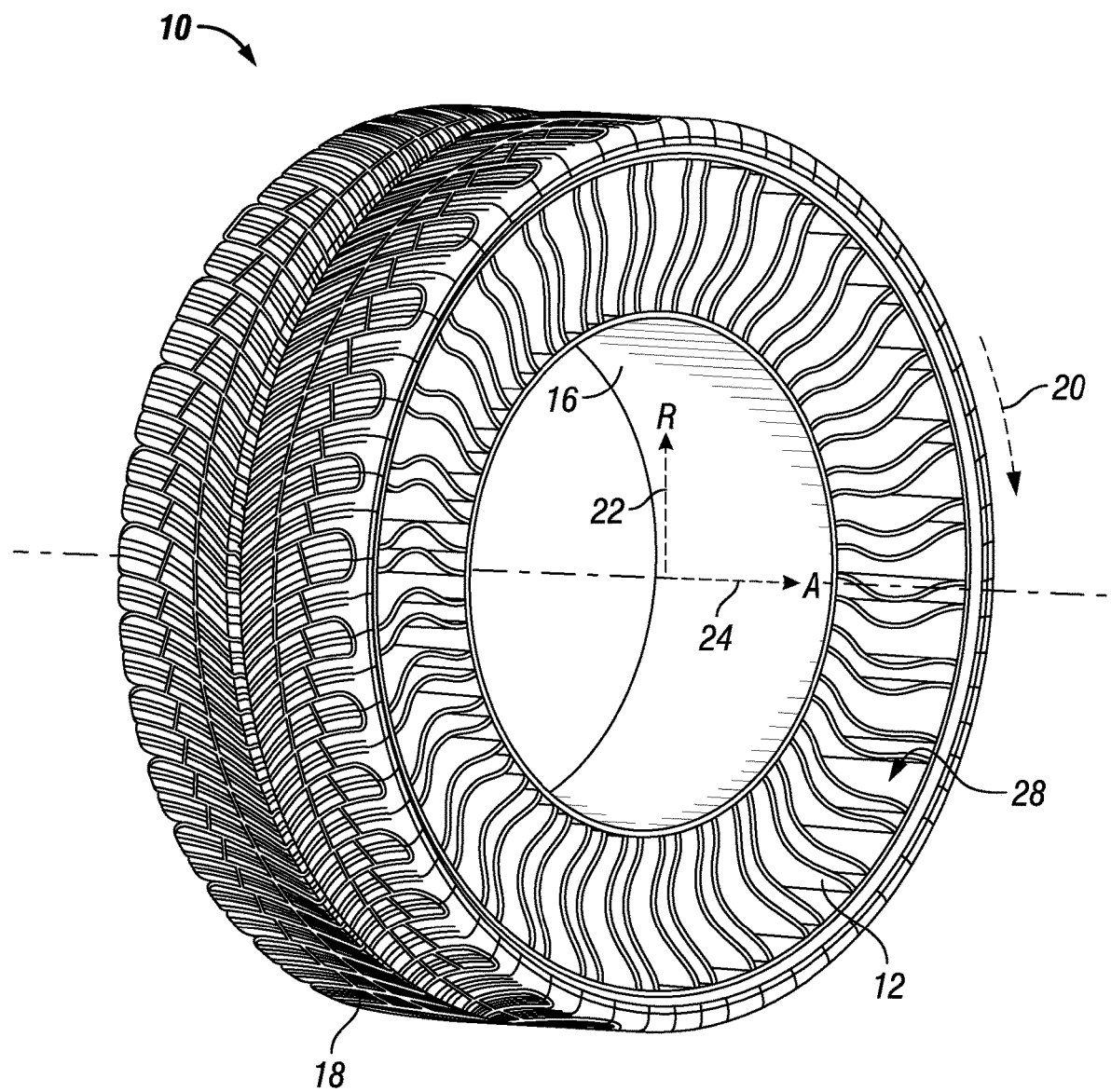
FIG. 1 is a perspective view of a tire with spokes.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a spoke 12 that has a crack suppression feature 14 thereon that can extend the life of the spoke 12 by stopping the propagation of a crack 68 that may develop in the spoke 12. The crack suppression feature 14 has a geometry that has a strain energy release rate that is below the threshold for crack 68 propagation such that a crack 68 does not propagate past this geometry.

With reference now to FIG. 1, a tire 10 that is airless is illustrated that includes a hub 16 and a tread 18. A series of spokes 12 are disposed in the radial direction 22 between the hub 16 and the tread 18. The spokes 12 may engage a compliant beam of the tread 18. The spokes 12 are disposed 360 degrees about the axis of the tire 10 such that the spokes 12 extend completely about the axis in the longitudinal direction 20 of the tire 10. The axial direction 24 of the tire 10 extends through the axis of the tire 10 and is perpendicular to the radial direction 22. The longitudinal direction 20 extends about the circumference of the tire 10 and in effect circles the axis of the tire 10. The spokes 12 function to support the tire 10 such that they are in bending deformation at the bottom of the tire 10 at the area in which the tread 18 engages the road, and are in tension at the top of the tire 10 in the area opposite from that which engages the road.

Figure 2:
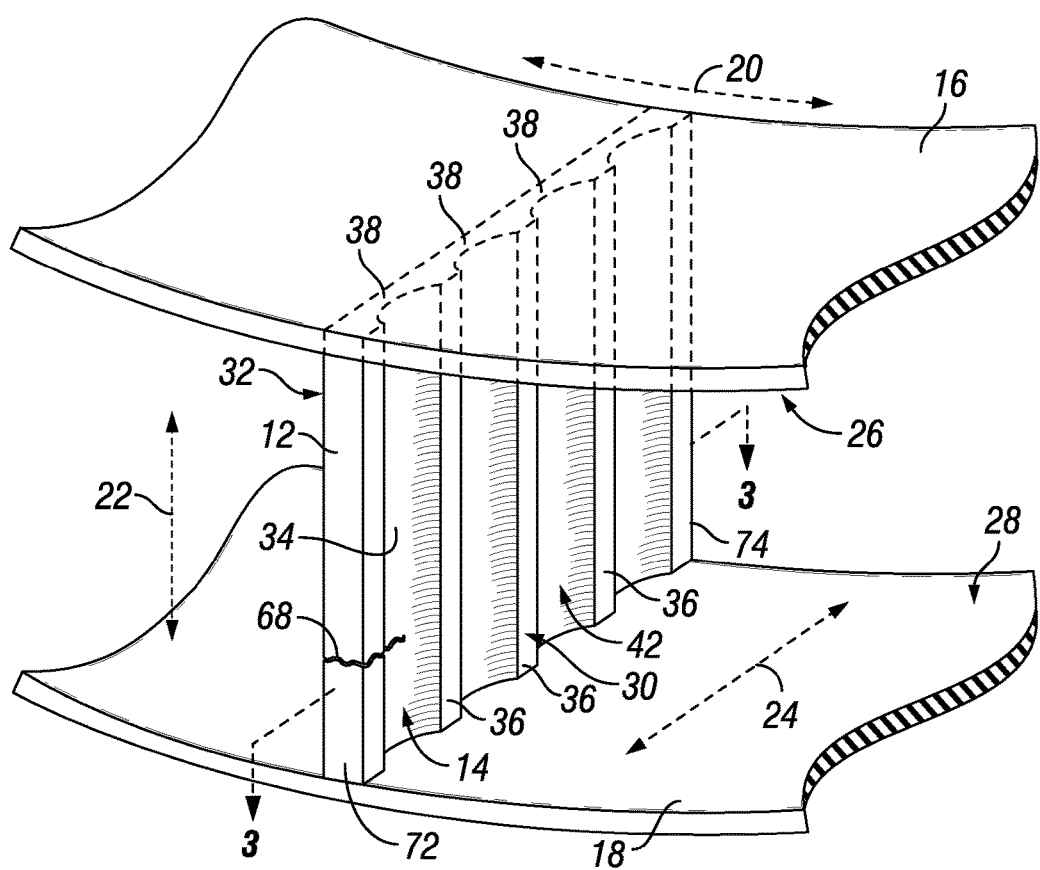
FIG. 2 is a perspective view of a tire with spokes that include a crack suppression feature in accordance with one exemplary embodiment.
Figure 3:
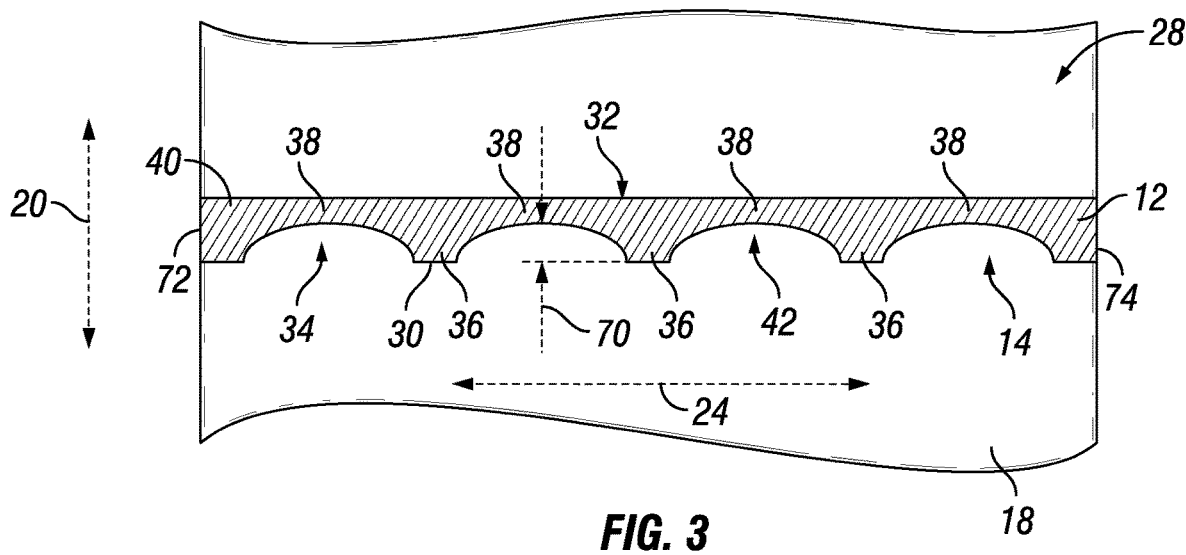
FIG. 3 is a cross-sectional view taken along line 3-3 of FIG. 2.
Figure 4:
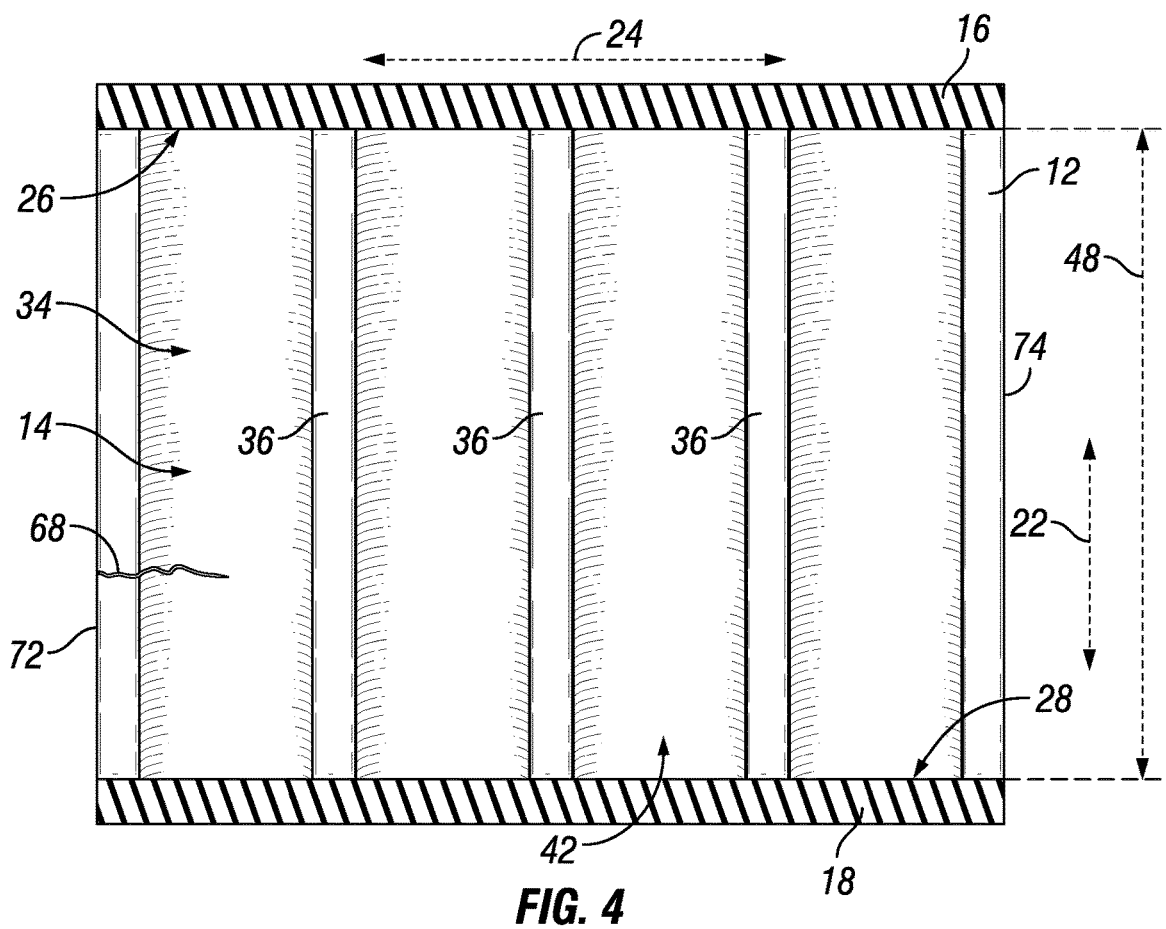
FIG. 4 is a front view of the crack suppression feature and associated elements of FIG. 2.

FIGS. 2-4 illustrate a portion of the tire 10 that includes one of the spokes 12. The spoke 12 engages the outer surface 26 of the hub 16 and extends to the inner surface 28 of the tread 18. The spoke 12 has a crack suppression feature 14 that functions to stop the propagation of cracks 68 through the spoke 12 to increase life of the spoke 12 and thus life of the tire 10. The crack suppression feature 14 can be provided in a variety of manners. As illustrated, the crack suppression feature 14 includes a groove 34 that extends into the first face 30 of the spoke 12. The groove 34 is semi-circular in cross-sectional shape and extends along the entire radial length 48 of the spoke 12 in the radial direction 22. However, in other exemplary embodiments the groove 34 may extend less than the entire radial length 48 in the radial direction 22. The crack suppression feature 14 may be present on only a single spoke 12 of the tire 10, or may be present on all of the spokes 12, or any number of the spokes 12 in accordance with various exemplary embodiments.

Although a single groove 34 may be present, any number of grooves 34 may be included in the crack suppression feature 14 in accordance with other exemplary embodiments. For example, from 2-4, from 5-10, from 11-20, from 21-50, or up to 200 grooves 34 may be included in the crack suppression feature 14 of the spoke 12 in other arrangements. The plurality of first grooves 42 illustrated in FIGS. 2-4 are four in number and they are all arranged in an identical manner. However, the grooves 34 need not all be identically arranged in other embodiments.

The groove 34 causes a thin section 38 to be formed in the spoke 12, and a series of first ribs 36 are located between the grooves 34 in the axial direction 24. The thin section 38 may be thought of as being located at a base 40 of the spoke 12, from which the ribs 36 may extend in the longitudinal direction 20. The spoke 12 has a second face 32 that is opposite from the first face 30. The crack suppression feature 14 may not be located at the second face 32. In this regard, the second face 32 may not include any grooves, ribs, or other features that inhibit crack 68 propagation. The first face 30 can be oppositely disposed from the second face 32 in the longitudinal direction 20 of the tire 10. In this regard, the faces 30 and 32 may extend the same distance in the axial direction 24 and in the radial direction 22 as one another, but are spaced from one another in the longitudinal direction 20 of the tire 10. The plurality of first grooves 42 may all be parallel to one another, or need not be parallel to one another in different arrangements. The grooves 42 may be spaced from the axial edges of the spoke 12 so that the grooves 42 are both inboard of the outer axial edge 72 of the spoke 12 and outboard of the inner axial edge 74 of the spoke 12.

A crack 68 is shown in the spoke 12 and extends from the outer axial edge 72 of the spoke 12 inboard in the axial direction 24. The crack 68 extends through the spoke 12 but stops in the thin section 38 of the groove 34 and does not continue on through the spoke 12 in the axial direction 24 from this point. Other cracks 68 could develop in the spoke 12 at other locations in the spoke 12 such as in one of the interior ribs 36. Here, the crack 68 would be stopped as grooves 42 each having thin sections 38 are on either side of the rib 36. The crack 68 may propagate axially inboard or outboard but would encounter one of the thin sections 38 before being able to traverse through the entire length of the spoke 12 in the axial direction 24. During use of the tire 10, the strain energy release rate is low in the thin sections 38 of the spokes 12. The thicker portions of the spoke 12, such as those that include the ribs 36, will have a high energy release rate. The cracks 68 that may develop in the thicker sections will cease to propagate once they reach the thin sections 38 where the energy release rate is below the threshold value for propagation.

The crack suppression feature 14 may be arranged on the spoke 12 so that it is offset from the outer axial edge 72 of the spoke 12 in the axial direction 24. In this regard, the portion of the first face 30 between the outer axial edge 72 and the groove 34 may not be provided with any features that function to stop crack 68 propagation. The area of the first face 30 between the inner axial edge 74 of the spoke 12 and the groove 34 nearest the inner axial edge 74 may likewise be provided with no features to stop crack 68 propagation such that the entire crack suppression feature 14 is spaced from the outer and inner axial edges 72 and 74.

Figure 5:
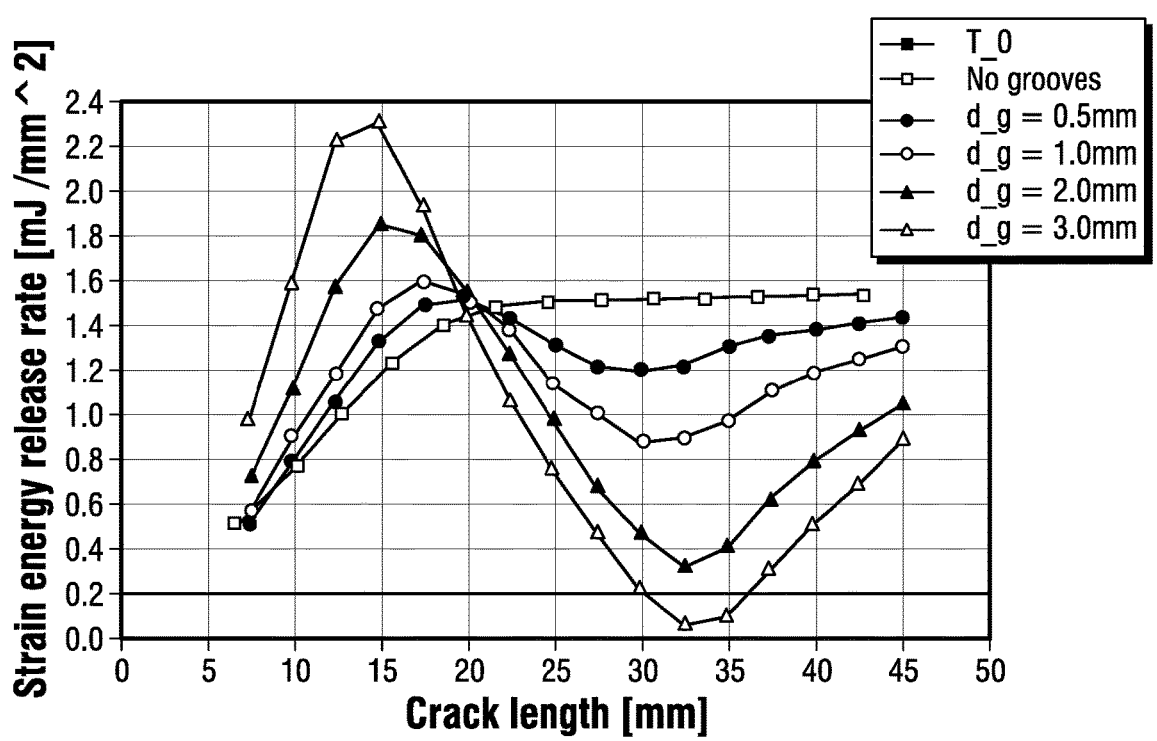
FIG. 5 is a graph that shows crack length versus strain energy release rate.

FIG. 5 illustrates a graph of crack length versus strain energy release rate to show how the crack suppression feature 14 will stop the propagation of the crack 68. The depth 70 of the groove 34 is the distance from the rib 36 at the first face 30 to the thin section 38 as shown for example in FIG. 3. The depth 70 is measured in the longitudinal direction 20. The depth 70 is shown in the FIG. 5 chart as being 0.5 mm, 1.0 mm, 2.0 mm, and 3.0 mm. Readings with no groves 34 present, and thus no crack suppression feature 14 present are also displayed in FIG. 5. The thickness of the spoke 16 in the longitudinal direction 20 is 4.0 mm. As an example, the threshold value for crack 68 propagation is 0.2 mJ/mm^2 for a particular material that may be used to make up the spokes 12.

It can be seen that as the crack 68 propagates in the axial direction 24, the strain energy release rate increases which in turn continues to cause the crack 68 to propagate. The presence of the crack suppression feature 14 causes the strain energy release rate to decrease as the crack 68 propagates through the groove 34. In the configuration with no groove 34, the strain energy release rate flattens out. In the configurations in which the groove depth 70 is 0.5 mm, 1.0 mm, and 2.0 mm, the crack 68 continues to propagate as the depths 70 of these grooves 34 are not great enough to push the strain energy release rate below the threshold of 0.2 mJ/mm^2. The cracks 68 will continue to move through the grooves 34 and will continue to propagate. However, with the depth 70 at 3.0 mm, the strain energy release rate is below the threshold of 0.2 mJ/mm^2 and the crack 68 stops propagating. The spoke 12 will no longer be damaged by the crack 68 as its progress will cease at the thin section 38. It is to be understood that the 3.0 mm depth 70 is for sake of one example and that various depths 70 are provided for in other arrangements in order to cause the strain energy release rate to fall below a required threshold for arresting the crack 68.

As the crack 68 extends in the axial direction 24, a peak in the energy release rate occurs as the crack 68 descends the walls of the rib 36. The energy release rate then falls dramatically as the crack 68 reaches the bottom of the groove 34 that includes the thin section 38. The crack 68 is arrested when it reaches a minimal energy release rate which may be at the thin section 38 at the bottom of the groove 34 if the energy release rate at this location is below the crack 68 propagation threshold.

Figure 6:
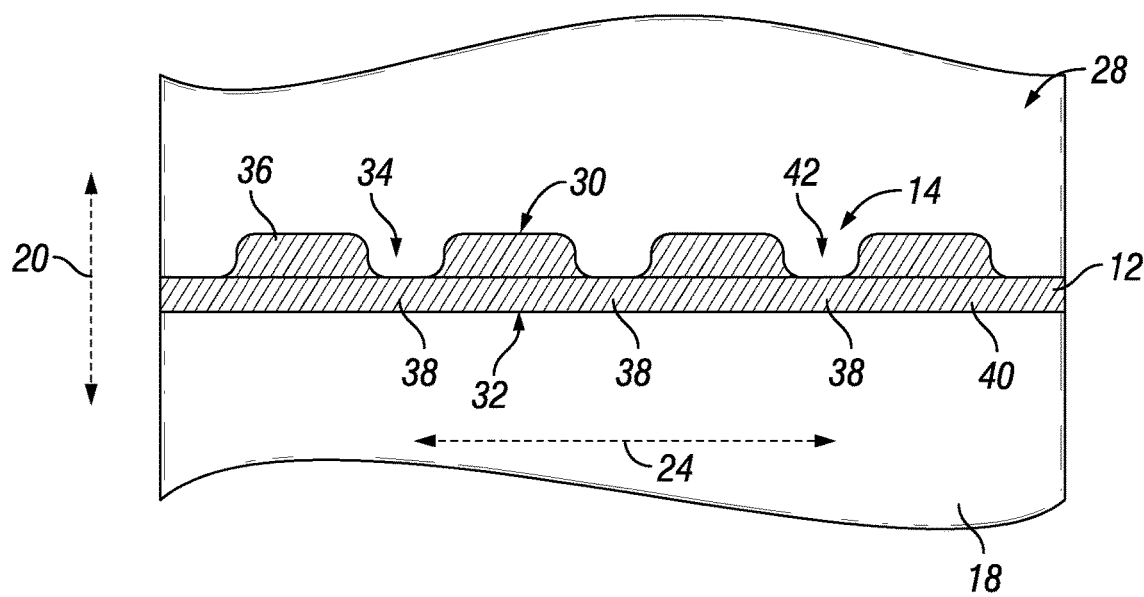
FIG. 6 is a top view of a spoke that includes a crack suppression feature in accordance with another exemplary embodiment.

The crack suppression feature 14 can be arranged in a variety of manners in accordance with other exemplary embodiments. With reference to FIG. 6, the crack suppression feature 14 includes a groove 34 that is not semi-circular in cross-sectional shape. Instead, the groove 34 extends in the longitudinal direction 20 to the base 40 of the spoke 12 and is flat at the thin section 38 in the axial direction 24. The remaining grooves in the plurality of grooves 42 can be arranged in the same way as groove 34, or may be configured in a different manner with respect to their size or shape. The base 40 may be a separate component from the ribs 36 such that the base 40 and ribs 36 are attached to one another. Alternatively, the ribs 36 and base 40 may be integrally formed with one another such that they are a single component. The second face 32 may be missing any crack suppression features 14.

Figure 7:
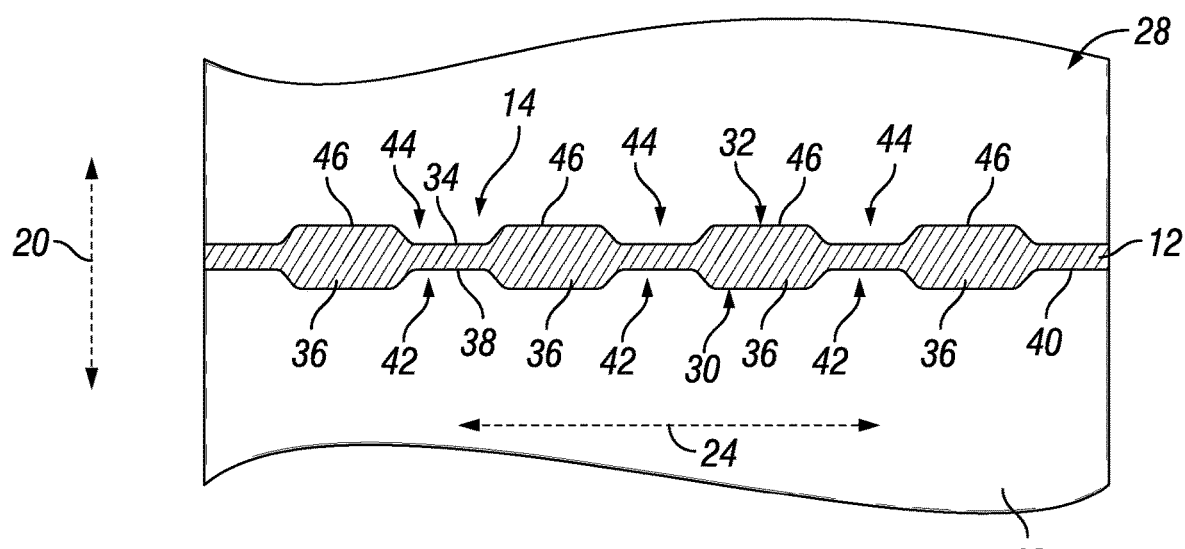
FIG. 7 is a top view of a spoke with a crack suppression feature in accordance with yet another exemplary embodiment.

The exemplary embodiment in FIG. 7 includes a plurality of first grooves 42 on the first face 30 that extend in the longitudinal direction 20 between a series of first ribs 36. The crack suppression feature 14 is also located on the second face 32 of the spoke 12 that is located opposite from the first face 30 in the longitudinal direction 20. A plurality of second grooves 44 may extend from the second face 32 in the longitudinal direction 20 between a plurality of second ribs 46. The grooves 42 and 44 can be shaped and sized in an identical manner to one another so the spoke 16 is symmetrical in the longitudinal direction 20 and axial direction 24. The ribs 36 and 46 may each extend from the base 40 an identical distance in the longitudinal direction 20. However, it is to be understood that the ribs 36 and 46 need not be symmetrically formed on the spoke 12 in other exemplary embodiments. Further, the number of ribs 36 may be different form the number of ribs 46 in other versions of the tire 10, and the shape and configurations of the ribs 36 may be different than those of ribs 46 in yet other designs of the tire 10.

Figure 8:
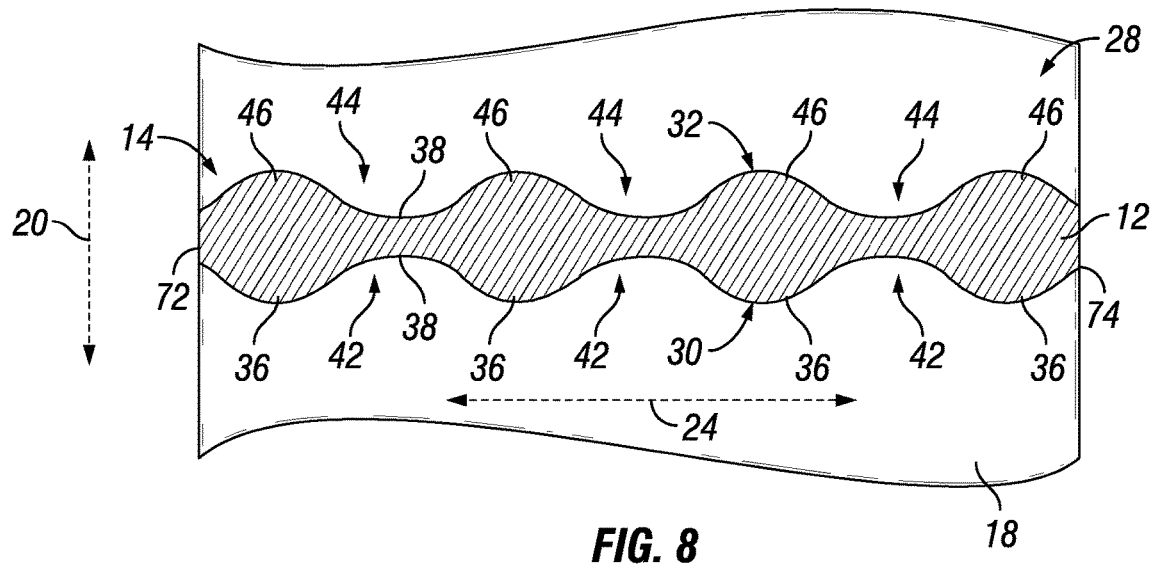
FIG. 8 is a top view of a spoke with a crack suppression feature in accordance with yet another exemplary embodiment.

FIG. 8 discloses a design of the crack suppression feature 14 in which the plurality of first grooves 42 and first ribs 36 form a sinusoidal shaped design on the first face 30. The first grooves 42 will again form a thin section 38 that will function to arrest the propagation of the crack 68 formed in the spoke 12. The second face 32 includes a plurality of second grooves 44 that are located between a plurality of second ribs 46 in the axial direction 24. The second grooves 44 and the second ribs 46 define a sinusoidal shaped second face 32 of the spoke 12. The second grooves 44 may be symmetrical with respect to the plurality of first grooves 42. The decrease in thickness in the longitudinal direction 20 will again cause the crack 68 to stop propagating through the spoke 12.

Figure 9:
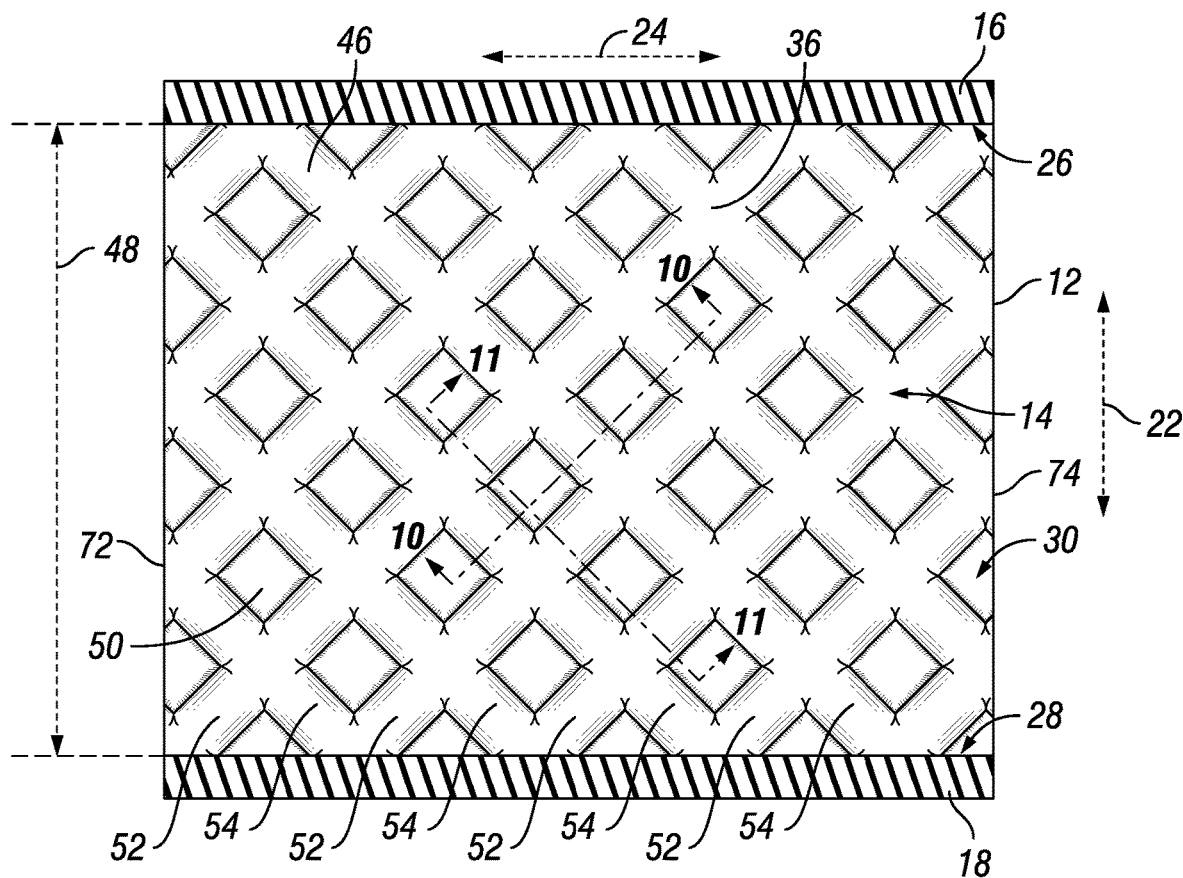
FIG. 9 is a front view of a spoke with a crack suppression feature that has a waffle pattern.
Figure 10:
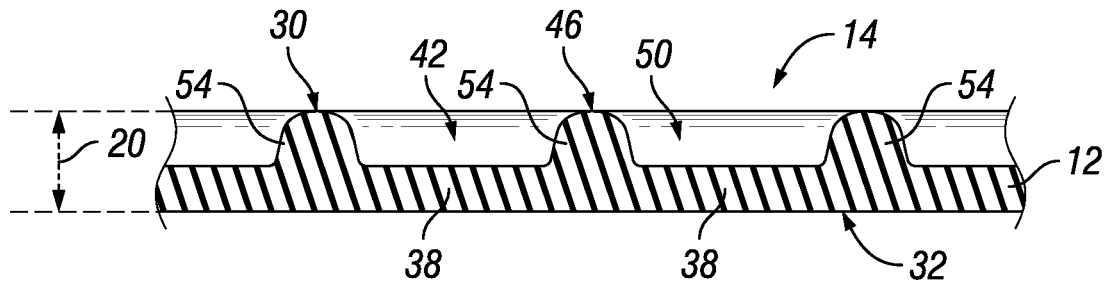
FIG. 10 is a cross-sectional view taken along line 10-10 of FIG. 9.
Figure 11:
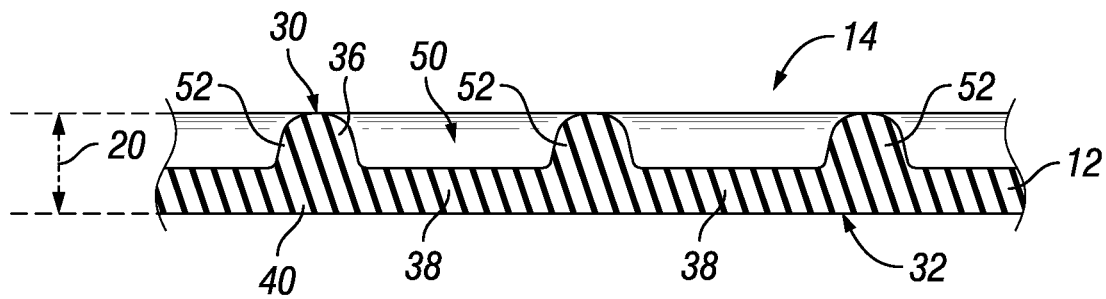
FIG. 11 is a cross-sectional view taken along line 11-11 of FIG. 9.

FIGS. 9-11 disclose an alternative exemplary embodiment of the crack suppression feature 14 in which a waffle pattern is formed on the first face 30. The waffle pattern may extend across the entire axial width of the first face 30 in the axial direction 24, and may extend across the entire radial height of the first face 30 in the radial direction 22. The waffle pattern is formed by a plurality of first ribs 36 arranged into a series of first rows 52 that are parallel to one another and that extend at an angle so as to have a component of extension in the axial direction 24 and in the radial direction 22. A plurality of second ribs 46 are arranged into a series of second rows 54 and are likewise parallel to one another and extend so as to have a component of extension both in the axial direction 24 and in the radial direction 22. The magnitudes of the components of extension may be the same for both the first rows 52 and the second rows 54.

The first and second ribs 36, 46 may extend from the base 40 of the spoke 12 and can all have the same height as one another in the longitudinal direction 20. The first row 52 and second row 54 intersect one another to form a series of diamond shaped voids 50 therebetween. Various thin sections 38 are located at the diamond shaped voids 50 and function to stop the propagation of cracks 68 through the spoke 12. The orientation of the diamond shaped voids 50 may be such that they likewise stop crack 68 propagation that goes in the radial direction 22 since areas of thicker and thinner material are present in this direction of the crack suppression feature 14 as well. The angled waffle pattern may maintain lateral stiffness of the spoke 12 and may also be used to tune the lateral stiffness of the tire 10. Although the first and second rows 52, 54 are shown as being oriented so as to have components of extension in both the radial direction 22 and the axial direction 24, it is to be understood that the rows 52, 54 need not have components of extension in both of these directions in other embodiments. For example, the first row 52 may extend only in the radial direction 22 and the second row 54 may extend only in the axial direction 24 in some embodiments so that the waffle pattern includes rectangular voids instead of the diamond shaped voids.

The crack suppression feature 14 may extend all the way out to the outer axial edge 72 and to the inner axial edge 74 so that the crack suppression feature 14 extends across the entire axial length of the spoke 12 in the axial direction 24. In other arrangements, the crack suppression feature 14 may be spaced from the outer axial edge 72 in the axial direction 24 so as to be inboard of the outer axial edge 72 such that some space is between the outer axial edge 72 and the rows 52, 54 and voids 50. Likewise, the spoke 12 can be arranged so that there is space in the axial direction 24 between the inner axial edge 74 and the rows, 52, 54 and voids 50.

Figure 12:
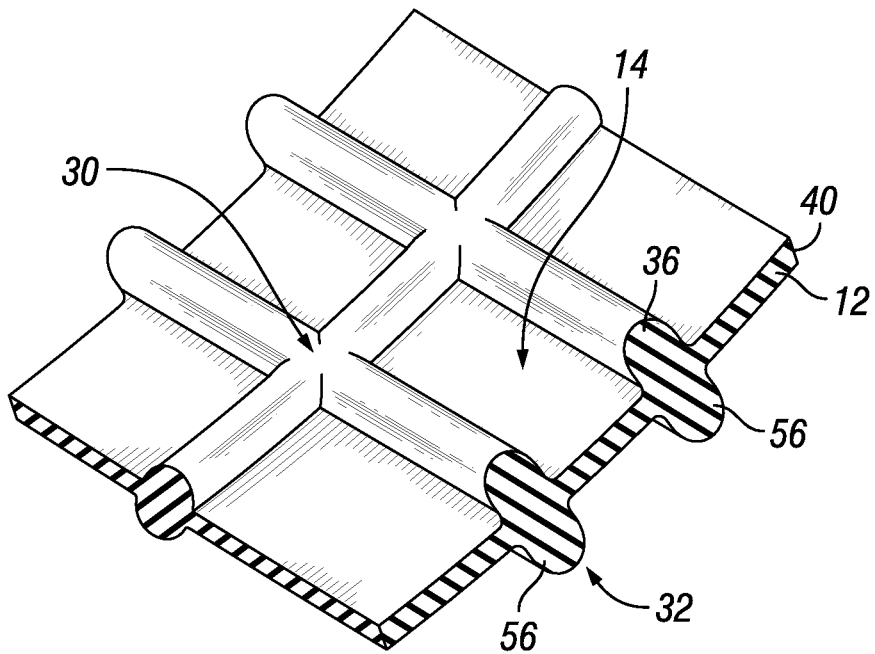
FIG. 12 is a perspective view of a crack suppression feature that has a waffle pattern in accordance with yet another exemplary embodiment.

The crack suppression feature 14, and hence the waffle pattern, may be located only on the first face 30 so that these features are not located at the second face 32. FIG. 12 shows an arrangement in which the crack suppression feature 14 is likewise located at the second face 32, in addition to the first face 30, so that the waffle pattern is likewise located at the second face 32. The ribs 56 on the second face 32 can be arranged in a series of rows the same way as the ribs 36 and 46 on the first face 30 to form the waffle pattern on the second face 32. The ribs 56 may be symmetrical with respect to the ribs 36 so that the waffle patterns on the first and second faces 30, 32 are symmetrical and identical to one another.

Figure 14:
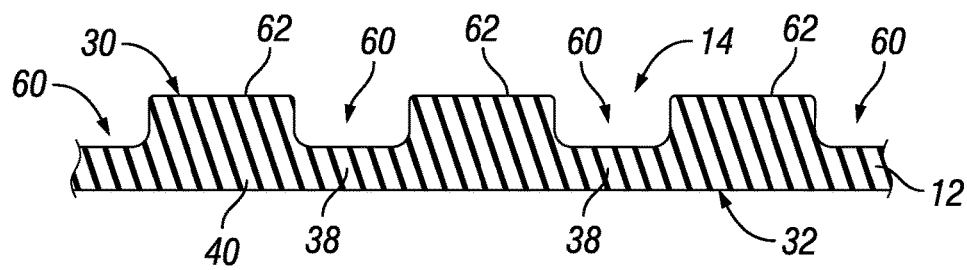
FIG. 14 is a cross-sectional view taken along line 14-14 of FIG. 13.
Figure 15:
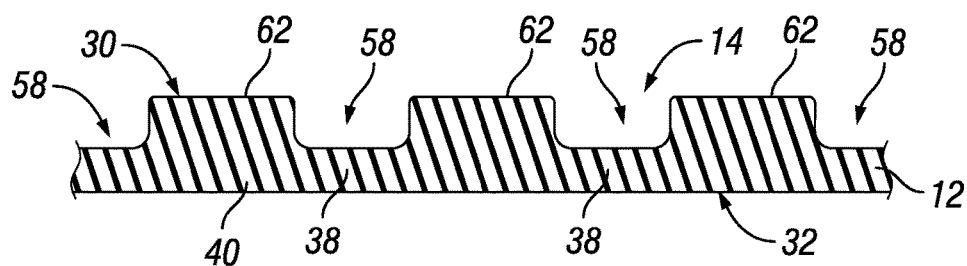
FIG. 15 is a cross-sectional view taken along line 15-15 of FIG. 13.

Another arrangement of the spoke 12 is illustrated with reference to FIGS. 13-15 in which the first face 30 includes a crack suppression feature 14 that has a first series of grooves 58 and a second series of grooves 60. The first series of grooves 58 are parallel to one another and extend so as to have a component of extension in both the radial direction 22 and the axial direction 24. Likewise, the second series of grooves 60 extend so as to have components of extension in both the radial and axial directions 22, 24 and are parallel to one another. The magnitude of the components of extension of the series of grooves 58, 60 may be the same as one another. In other arrangements, the series of grooves 58 or 60 may not have components of extension in both the radial and axial directions 22, 24 but instead may have a component of extension in only one of those directions. For example in one arrangement the first series of grooves 58 may extend only in the radial direction 22 and not in the axial direction 24, while the second series of grooves 60 extends in the axial direction 24 but not in the radial direction 22.

The series of grooves 58, 60 intersect one another to form a waffle pattern that includes a plurality of projections 62 therebetween. In the embodiment in FIGS. 13-15 the projections 62 are diamond shaped projections 62 that extend upwards from the base 40 and are all of the same size and shape. The first and second series of grooves 58, 60 define with the base 40 and the projections 62, a series of thin sections 38 that function to stop crack 68 propagation due to these areas having a strain energy release rate that is too low to continue crack 68 propagation. The crack suppression feature 14 may be present on only the first face 30 of the spoke 12, and not on the second face 32. The design with the waffle pattern with the projections 62 and grooves 58, 60 may relieve stress in the projections 62 while keeping extensional stiffness high.

The crack suppression feature 14 can be located at the outer and inner axial edges 72, 74 such that the first and second series of grooves 58, 60 and the projections 62 are present at the edges 72, 74. In other embodiments, the first and second series of grooves 58, 60 and the projections 62 may be spaced from the outer axial edge 72 and/or the inner axial edge 74 in the axial direction 24.

Figure 16:
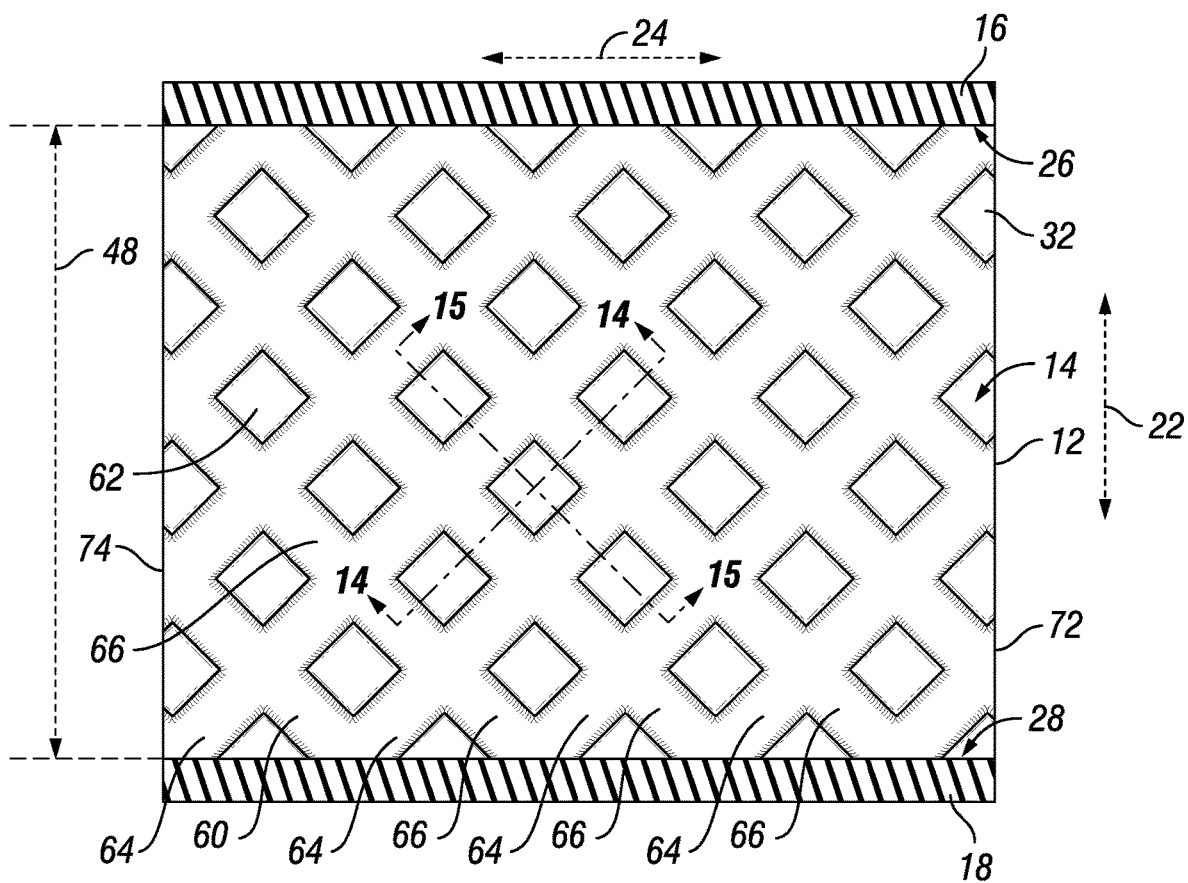
FIG. 16 is a back view of the spoke of FIG. 13.

In other exemplary embodiments, the crack suppression feature 14 may be located on the second face 32 in addition to being located on the first face 30. The second face 32 of the spoke 16 is shown in FIG. 16 and the crack suppression feature 14 is arranged in a waffle pattern on the second face 32. A third series of grooves 64 extend along the second face 32 so as to have components of extension in both the radial direction 22 and the axial direction 24. The rows of the third series of grooves 64 are all parallel to one another. A fourth series of grooves 66 are also included in the crack suppression feature 14 and extend so as to have components of extension in both the radial direction 22 and the axial direction 24. The rows of the fourth series of grooves 66 are all parallel to one another. The third and fourth series of grooves 64, 66 intersect one another and form projections 62 therebetween. The projections 62 may be diamond shaped in accordance with certain exemplary embodiments, but could be rectangular or square in shape in other embodiments when the third and fourth series of grooves 64, 66 are differently arranged. The third and fourth series of grooves 64, 66 form areas where the strain energy release rate is too low to continue crack 68 propagation so that the crack suppression feature 14 functions to arrest crack 68 development. Again, although shown as being located at the outer and inner axial edges 72, 74 the first and second rows 52, 54 and the voids 50 may be spaced from the edges 72 and/or 74 in other arrangements.

Although described as having series of grooves 58 and 60 that are parallel to one another, and a series of grooves 64 that are parallel and a series of grooves 66 that are parallel to one another. It is to be understood that other arrangements of the crack suppression feature 14 can be provided in which the series of grooves 58 are not parallel to one another and/or in which the series of grooves 60 are not parallel to one another. The same holds true for the series of grooves 64 and 66 if provided. For example, the series of grooves 58 may extend in a curved manner, in a sinusoidal manner, or some other arrangement to one another in which they do not extend straight and parallel to one another. The same holds true for the series of grooves 60, 64 and 66 if provided. By making the series of grooves 58, 60, 64 and 66 extend in various manners to one another, the spoke 12 properties can be tuned as desired.

The material making up the tire 10 that includes the spoke 12 and the crack suppression feature 14 may be any type of material or materials, and may include, for example polyurethane. In other embodiments other thermosetting or thermoplastic materials could be used. Various types of manufacturing processes may be used to construct the tire 10 such as rotational molding, casting, or injection molding. The spokes 12 may be de-moldable by radial retraction. As used herein, the spoke 12 may be a portion of the tire 10 that is not a sidewall of the tire 10 but is instead a portion of the tire 10 that itself does to extend completely 360 degrees about the axis 24 but some amount less than 360 degrees about the axis 24.

Figure 13:
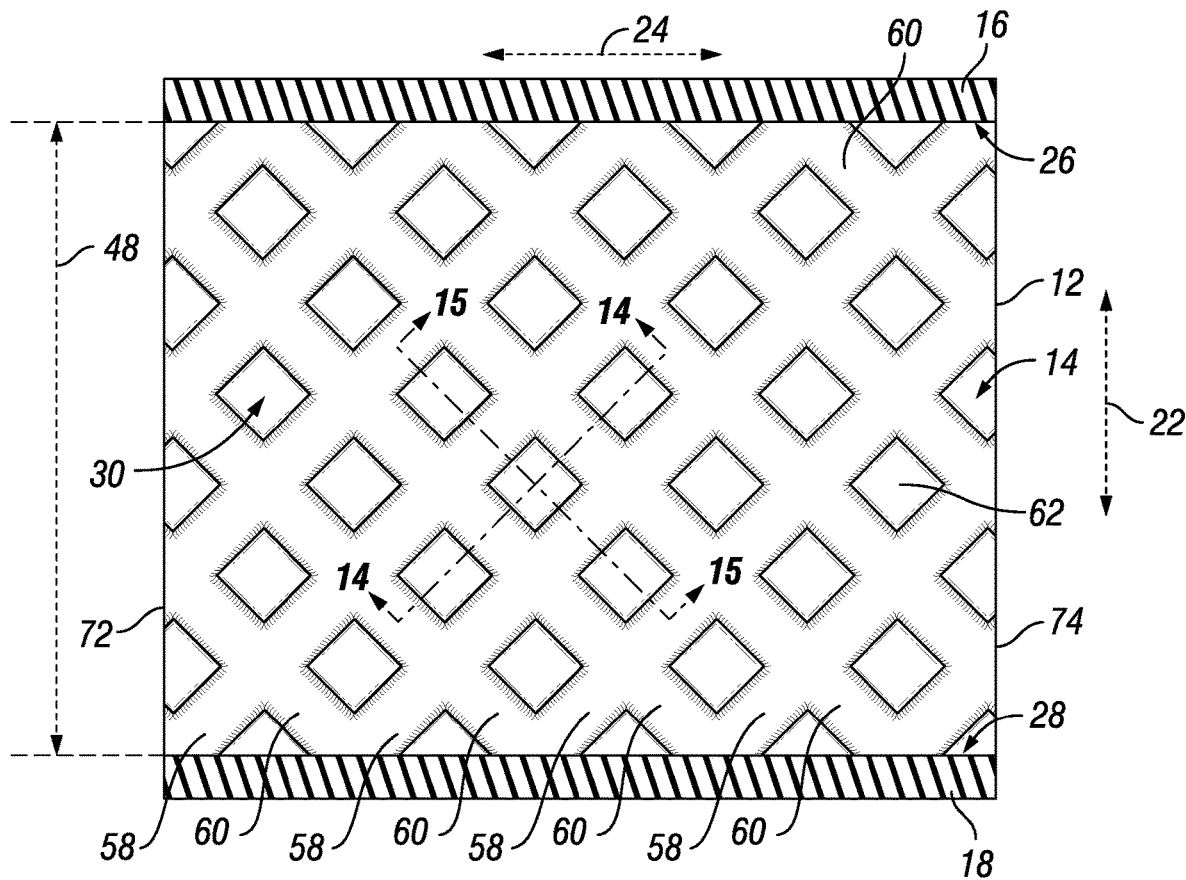
FIG. 13 is a front view of a crack suppression feature that has a waffle pattern with diamond shaped projections in accordance with another exemplary embodiment.

Various drawings such as FIGS. 4, 9 and 13 show the spoke 12 extending upwards in the radial direction 22 so as to be flat in extension in the radial direction 22, and with no component of extension in the longitudinal direction 20. In some applications of the tire 10, the spoke 12 will be bent forward or rearward in the longitudinal direction 20, and thus will extend from the hub 16 in the longitudinal direction 20, so that the spoke 12 does not extend completely in the radial direction 22 in a flat manner. This bending of the spoke 12 may occur when the spoke 12 is at rest and does not have compression or tension imparted thereon. Further, this bending of the spoke 12 may occur when the spoke 12 is at rest, when it has compression applied thereon, and when it has tension applied thereon. As such, the illustrations disclose the spoke 12 as not extending in the longitudinal direction 20 for purposes of clarity, but it is to be understood that various arrangements exist in which the spoke 12 does in fact extend forward or rearward in the longitudinal direction 20 when connected to the hub 16 and tread 18. The features described as parallel in this disclosure, such as the grooves 34, first ribs 36, plurality of first grooves 42, plurality of second grooves 44, first rows 52, second rows 54, first series of grooves 58, second series of grooves 60, third series of grooves 64, and fourth series of grooves 66 are parallel in that they are parallel along a surface of the first face 30 or second face 32 of the spoke 12. If the spoke 12 is curved upon extension from the hub 16 so as to extend in both the radial direction 22 and the longitudinal direction 20, the features on the spoke 12 are still parallel as disclosed because they are parallel along the surface of the faces 30, 32 even though these surfaces of the faces 30, 32 are curved because they extend in the longitudinal direction 20. As such, as defined in the claims as being parallel, the features are parallel if the spoke 12 extends in the longitudinal direction 20 from the hub 16 if the spoke 12 were flattened out such that it is not curved and thus does not extend in the longitudinal direction 20. The spokes 12 may be provided with a draft angle during manufacture and may not be perfectly straight in the axial direction 24.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A tire, comprising:
   a hub; and
   a spoke that extends from the hub in a radial direction of the tire, wherein the spoke has a first face and a second face that are spaced from one another in a longitudinal direction of the tire, wherein the spoke has a crack suppression feature that has a groove that extends into the first face, wherein the groove has a length extending in the radial direction and a width shorter than the length extending perpendicular to the length, wherein the groove extends in the radial direction
   wherein the groove is one of a plurality of first grooves of the crack suppression feature that extend into the first face and are spaced from one another in an axial direction of the tire, wherein the plurality of first grooves extend in the radial direction; and
   wherein the crack suppression feature has a plurality of second grooves that extend into the second face, wherein the plurality of second grooves extend in the radial direction, wherein the first face and the second face are oppositely disposed to one another in the longitudinal direction
   wherein a plurality of first ribs are located at the first face, wherein successive ones of the first ribs are located between successive ones of the plurality of first grooves in the axial direction, wherein the plurality of first ribs and the plurality of first grooves are shaped such that the first face has a sinusoidal shape in the axial direction; and
   wherein a plurality of second ribs are located at the second face, wherein successive ones of the second ribs are located between successive ones of the plurality of second grooves in the axial direction, wherein the plurality of second ribs and the plurality of second grooves are shaped such that the second face has a sinusoidal shape in the axial direction.

2. The tire as set forth in claim 1, wherein the spoke extends from the hub in the longitudinal direction, and wherein the groove extends in the longitudinal direction.

3. The tire as set forth in claim 1, wherein the groove extends across an entire radial length of the spoke, wherein the groove is semi-circular in cross-sectional shape.

* * * * *